June 8, 1926.
H. R. ALLEN ET AL
VEHICLE SHOCK ABSORBER
Filed Dec. 31, 1923
1,587,575
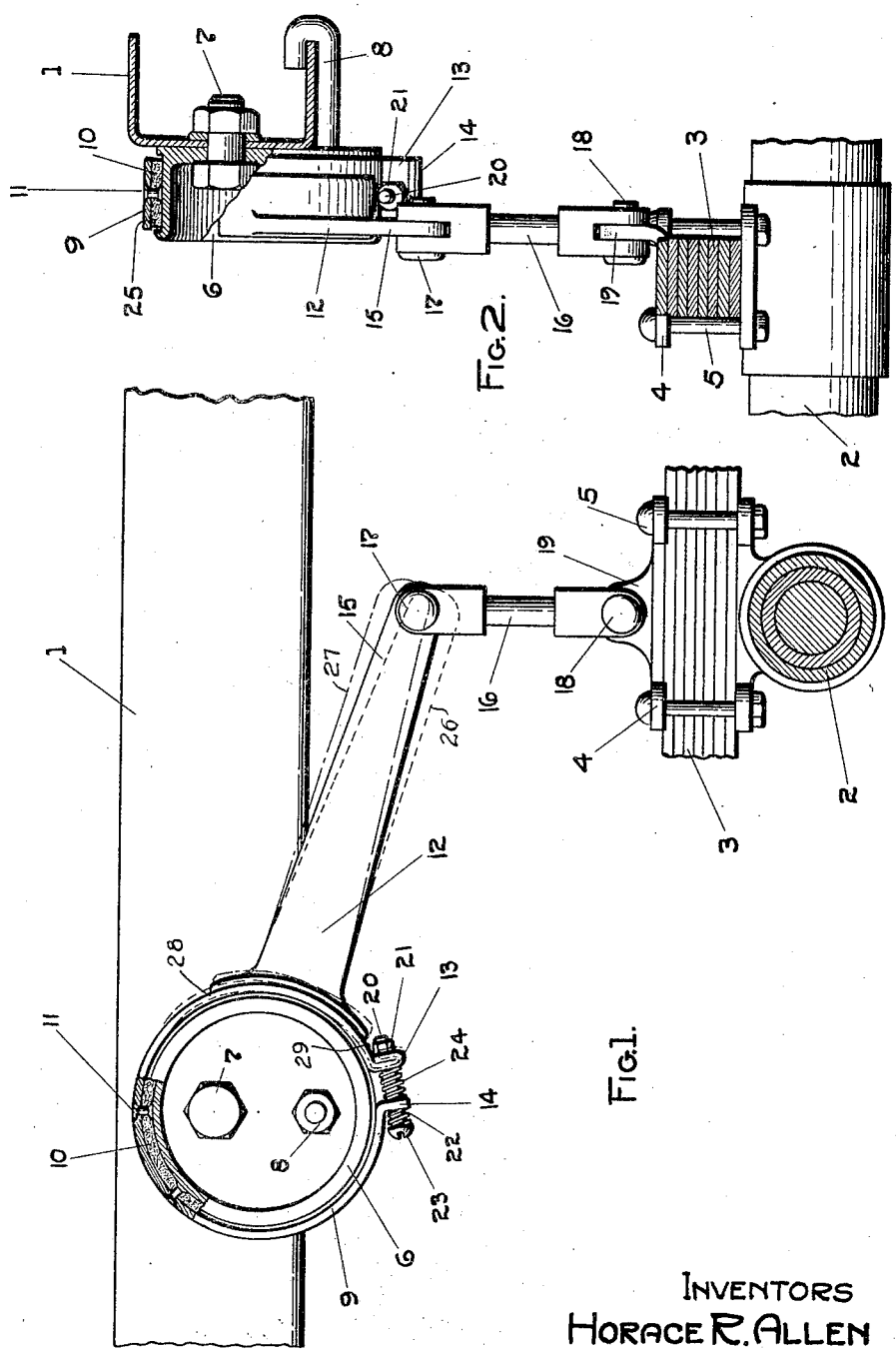
INVENTORS
HORACE R. ALLEN
CHAS. E. PEARSON Patented June 8, 1926.

1,587,575

UNITED STATES PATENT OFFICE.

HORACE R. ALLEN AND CHARLES E. PEARSON, OF INDIANAPOLIS, INDIANA, ASSIGNORS OF ONE-THIRD TO JOSEPH J. MARTIN, OF INDIANAPOLIS, INDIANA.

VEHICLE SHOCK ABSORBER.

Application filed December 31, 1923. Serial No. 683,797.

Our invention relates to vehicle spring damping mechanisms and more particularly to the main running gear springs of self propelled vehicles; and consists substantially in the construction, combination and arrangement of parts hereinafter set forth and pointed out more particularly in the claims.

An object of our invention is to provide a simple, quiet and efficient means for resisting the working movement of running gear springs for self propelled vehicles, to lessen the road shocks usually felt in such vehicles when traveling over rough or irregular road surfaces.

It is a primary object of our invention to provide a vehicle shock absorber embodying a stationary cylindrical brake mechanism and a thin flexible band cooperating therewith thru a lever attached to said band adapted to buckle or kink said band when operated thereby and thus grip said mechanism more tightly under certain conditions.

It is also a primary object of our invention to provide a vehicle shock absorber embodying a relatively stationary cylindrical brake mechanism and a flexible brake band cooperating therewith thru a lever attached to said band near one termination thereof so that said band will be thereby buckled more severely on the rebound movements of said absorber and thus retard said movements with greater resistance than the corresponding yielding movements thereof.

It is also an object of our invention to provide a vehicle shock absorber for resisting the working movements of vehicle running gear springs, to lessen the shocks usually incident to such vehicle, but more especially to retard the rebound movements of such springs.

The above and other objects are attained by the structure illustrated in the accompanying drawings, in which: Fig. 1 is a reduced fragmentary side elevation of our invention, showing fragmentarily the adjacent parts of a self propelled vehicle to which same is attached. Fig. 2 is a fragmentary end view elevation of our invention projected substantially from Fig. 1.

Referring to the characters of reference; 1 designates one of the chassis frame spans of the self propelled vehicle to which our invention is shown attached in working relation thereto. 2 designates a corresponding axle means therefor. 3 is a running gear spring which is supported by the axle means 2 and clamped thereto by the plate 4, said spring being disposed between said plate and said axle and securely confined in such relation by means of the bolts 5 which connect said plate with said axle means.

The shock resisting portion of our invention consists of the cylinder 6 which is secured to the frame span 1 by the bolt means 7 and 8. The flexible band 9 encircles the cylinder 6 in brake relation thereto, the asbestos lining 10 being secured to said band by means of the rivets 11 and disposed between said cylinder and said band in close fitting relation thereto. The lever 12 is secured to the band 9 nearer the termination 13 of said band than the termination 14 thereof. The free end 15 of said lever is connected to the plate 4 by means of the link 16; said link being pivoted at one end to the free extremity 15 of said lever by means of the clevis pin 17 and the other end of said link means being pivoted to the plate 4 by means of the clevis pin 18 which engages the apertured ear 19 formed on said plate.

The terminations 13 and 14 of the band 9 form corresponding lugs respectively adapted to receive the bolt 20 said bolt passing loosely thru the lug 14 and being adjustably threaded into the lug 13 and locked thereto by means of the lock nut 21. The band 9 is of suitable size and shape to be springingly tensioned inwardly, independent of any other force; the lining 10 being thus held in frictional contact with the cylinder 6. While such inward tension of the band 9 itself, may be sufficient under some conditions to press said band against said cylinder, we have provided an expansion coil type spring 22 interposed between the head 23 of the bolt 20 and the lug 14; said spring conveniently encircling said bolt, said spring tending to press the lugs 13 and 14 together, by which arrangement the frictional pressure of the lining 10 against said cylinder may be increased, it being understood that the effect of such spring in this connection may be varied by adjusting the bolt 20 longitudinally in the lug 13; it also being understood that the spring 22 may be replaced by other springs of suitable pressure to aid further in giving the desired result. Another expansion coil spring 24 is interposed between the lugs 13 and 14 which also conveniently encircles the bolt 20, said spring being suitably selected to counteract the closing tension of the spring 22 in relation to the band 9, as desired, and also to counteract the natural closing tension of said band, it being understood that other springs may be interchanged for both the spring 22 and 24 to give the desired results for any particular circumstance.

It is understood that the frame span 1 is supported by the axle means 2 thru the spring 3 by means of usual and conventional brackets and connections not shown, and when such vehicle is in use the road shocks received by the axle means 2 are greatly diminished by means of said spring so that vertical movements of said axle means will greatly exceed the corresponding movements of the frame span 1, as is understood by those familiar with the art. This being true, the distance between said axle means and said frame span is constantly changing and the cylinder 6 being secured to said frame span as before described, serves as a frictional pivot for the band 9, the lever 12 of said band being connected to the axle means 2 by means of the link 16, the clevis pins 17 and 18, the plate 4 and the bolts 5. By this arrangement the normal relative movements of the axle means 2 in relation to the frame span 1 will cause the band 9 to oscillate constantly on the cylinder 6, the lining 10 being in braking contact therewith.

The band 9 is constructed thin enough to be readily flexible and the lever 12 being secured thereto tends to kink or buckle said band when movement is imparted thereto thru said lever by which arrangement said band is shortened about the cylinder 6 tending to correspondingly cause the lining 10 to grip the cylinder 6 more intensely, it being thus understood that shocks of more sudden impact tend to cause said band to grip said cylinder more intensely accordingly, by which arrangement our invention will automatically resist the greater shocks with greater force than the minor shocks.

We have noticed that by securing the lever 12 closer to one of the lugs 13 and 14, than the other, as before indicated, that movements of said lever toward the nearest of said lugs, will cause the band 9 with the lining 10, to grip the cylinder 6 with greater intensity than the corresponding movement away from said lug. We have therefore as before mentioned, secured said lever to the band 9 nearer the lug 13 than the lug 14, by which arrangement the downward or yielding movements of the frame span 1 will meet with less resistance from our invention than the corresponding return or rebound movements. We consider this to be a very important and useful feature of our invention due to the more destructive nature of the rebound movements than the corresponding yielding movements, as understood by those familiar with the art, it being desirable therefore to more greatly resist said rebound movements than said yielding movements.

The groove 25 is formed externally in the cylinder 6 and is adapted to contain the lining 10 of the band 9 and then retain said band on said cylinder by which same is prevented from being unintentionally removed from said cylinder.

As above mentioned, movement of the lever 12 tends to kink the band 9. This is illustrated in a somewhat exaggerated manner by the dotted lines 26 and the dot-and-dash lines 27 of Fig. 1, the yielding position being indicated by said dot-and-dash lines and the rebound position being indicated by said dotted lines.

It will be observed that the rebound movement kinks the band 9 at point 28 thereof, point 29 of said band serving as a heel or fulcrum for such movement. Said band being thus kinked will be shortened and accordingly tightened and said band will thus be held into greater tension with the drum 6 as desired.

It will also be observed that the yielding movement springs the portion of the band 9, adjoining the lever 12, away from the drum 6, said band being correspondingly kinked at point 28 which serves as a heel or fulcrum for such movement. By this arrangement the yielding movement tends to lessen the tension of said band against the drum 6 as desired.

It is understood that the cylinder 6 may be carried by the axle means 2 in which case the lever 12 would be connected with the frame span 1 by which arrangement the functioning of the apparatus would be substantially the same, although the position of same would be reversed.

The flexible band 9, as before indicated, springingly encloses the cylinder 6 said band being so individually tensioned inwardly against said cylinder as to independently retain the lining 10 in close wrapped relation to said cylinder.

The lever 12 is conveniently welded to the band 9, although other means of securing said lever to said band may be employed, such as riveting or bolting.

While we are aware that shock absorbers of this class have been constructed with levers adjoining one of the terminations of the band means or in such proximity thereto as to be disposed parallel to the space between such terminations, our mechanism differs therefrom in having our lever radially arranged and secured to our band means apart from the terminations thereof, at substantially thirty degrees therefrom, by which arrangement our invention is rendered more efficient.

We have noticed by extensive practical demonstrations that during increased speed in the movements of the lever 12, especially in the rebound movements thereof, the band 9 automatically grips the cylinder 6 correspondingly tighter, by which characteristic the more severe shocks received by the vehicle are correspondingly resisted. For example, when one of the vehicle wheels (not shown) encounters an unusually deep rut in the roadway, the degree of falling speed will be correspondingly resisted by the increased degree of tension of said band on said cylinder and the rebound movement being proportionately more rapid will likewise be resisted accordingly.

While we have illustrated in a general way, certain instrumentalities which may be employed in carrying our invention into effect, it is evident that many modifications may be made in the various details, without departing from the scope of the appended claims, it being understood that our invention is not restricted to the particular forms herein described.

We claim as our invention:

1. In shock absorbing devices for vehicles, in which the movements of running gear springs are restricted by frictional cylinder means connected between the vehicle chassis frame and the corresponding axle means, of a cylinder secured to said chassis frame; a flexible band means frictionally encircling said cylinder; a lever means connecting said axle means to said band means whereby the movements of said axle will buckle said band means into closer frictional contact with said cylinder; lugs formed on the terminations of said band means; a bolt passing thru said lugs; a spring interposed between the head of said bolt and the adjacent lug; tending to close said band means; a spring means interposed between said lugs serving to counteract the first mentioned spring means and threaded means whereby said bolt may be adjusted in said lugs to vary the effect of said springs.

2. In shock absorbing devices for vehicles, in which the movements of running gear springs are restricted by frictional cylinder means connected between the vehicle chassis frame and the corresponding axle means, of a cylinder secured to said chassis frame; a flexible band means frictionally encircling said cylinder; lugs formed on the terminations of said band means; a bolt passing thru said lugs; and a spring interposed between said bolt head and the adjacent lug, tending to close said band means; a lever means connecting said axle means to said band means whereby the movements of said axle will buckle said band means into closer frictional contact with said cylinder, said lever being connected to said band closer to one of said lugs than the other and adapted to buckle said band more intensely when moved in the direction of said lugs; and another spring interposed between said lugs and adapted to counteract the closing tendency of the first mentioned spring.

3. In shock absorbing devices for vehicles, in which the movements of running gear springs are restricted by frictional cylinder means connected between the vehicle chassis frame and the corresponding axle means, of a cylinder secured to said chassis frame; a flexible band means springingly enclosing said cylinder in frictional contact therewith; lugs formed on the terminations of said band means; one of which is apertured and one of which is female threaded; a bolt passing thru said lugs being threaded to the last mentioned; a spring interposed between said bolt head and said apertured lug, tending to close said band means in cooperation with the springingly enclosing tendency of same and adapted to have its working tension varied by adjustment of said bolt in the threaded lug; a lever means connecting said axle means to said band means whereby the movements of said axle will buckle said band means into closer frictional contact with said cylinder, said lever being connected to said band closer to one of said lugs than the other and adapted to buckle said band more intensely when moved in the direction of the nearest lug; and another spring interposed between said lugs and adapted to counteract the closing tendency of said band means and the first mentioned spring.

4. In shock absorbing devices for vehicles, in which the movements of running gear springs are restricted by frictional cylinder means connected between the vehicle chassis frame and the corresponding axle means, of a cylinder secured to said chassis frame; a flexible band means springingly enclosing said cylinder in frictional contact therewith; lugs formed on the terminations of said band means, one of which is apertured and one of which is female threaded; a bolt passing thru said lugs being threaded to the last mentioned; a spring interposed between said bolt head and said apertured lug, tending to close said band means in cooperation with the springingly enclosing tendency of same and adapted to have its working tension varied by adjustment of said screw in said threaded lug; a lever means connecting said axle means to said band means whereby the movements of said axle will buckle said band means into closer frictional contact with said cylinder, said lever being connected to said band closer to one of said lugs than the other and adapted to buckle said band more intensely when moved in the direction of the nearest lug; another spring interposed between said lugs and adapted to counteract the closing tendency of said band means and the first mentioned spring; and a groove means formed on said cylinder to retain said band means on said cylinder.

In testimony whereof, we have hereunto set our hands on this the 29 day of December, A. D., 1923.

HORACE R. ALLEN.
CHAS. E. PEARSON.